(12) United States Patent
Lindt

(10) Patent No.: US 11,798,736 B2
(45) Date of Patent: Oct. 24, 2023

(54) CONDUCTOR ARRANGEMENT, SYSTEM AND METHODS FOR AN INDUCTIVE POWER TRANSFER

(71) Applicant: Bombardier Primove GmbH, Berlin (DE)

(72) Inventor: Rudolf Lindt, Weinheim (DE)

(73) Assignee: Bombardier Primove GmbH, Berlin (DE)

( * ) Notice: Subject to any disclaimer, the term of this patent is extended or adjusted under 35 U.S.C. 154(b) by 0 days.

(21) Appl. No.: 17/270,535

(22) PCT Filed: Aug. 6, 2019

(86) PCT No.: PCT/EP2019/071142
§ 371 (c)(1),
(2) Date: Feb. 23, 2021

(87) PCT Pub. No.: WO2020/038716
PCT Pub. Date: Feb. 27, 2020

(65) Prior Publication Data
US 2021/0193383 A1    Jun. 24, 2021

(30) Foreign Application Priority Data
Aug. 24, 2018 (GB) ..................................... 1813803

(51) Int. Cl.
*H02J 50/10* (2016.01)
*H01F 38/14* (2006.01)
(Continued)

(52) U.S. Cl.
CPC .............. *H01F 38/14* (2013.01); *B60L 53/12* (2019.02); *H01F 27/38* (2013.01); *H01F 41/04* (2013.01)

(58) Field of Classification Search
CPC .......... H01F 38/14; H01F 27/38; H01F 41/04; B60L 53/12; B60L 5/005; Y02T 10/70; Y02T 10/7072; Y02T 90/14; B60M 7/003
See application file for complete search history.

(56) References Cited

U.S. PATENT DOCUMENTS

| | | | |
|---|---|---|---|
| 7,397,246 B2 * | 7/2008 | Freytag | G01R 33/34069 324/318 |
| 2005/0237144 A1 * | 10/2005 | Einzinger | H01F 17/0006 336/200 |

(Continued)

FOREIGN PATENT DOCUMENTS

| | | | |
|---|---|---|---|
| CN | 106300691 A | | 1/2017 |
| CN | 106300691 B | * | 1/2019 |

(Continued)

*Primary Examiner* — Jared Fureman
*Assistant Examiner* — Esayas G Yeshaw
(74) *Attorney, Agent, or Firm* — The Webb Law Firm

(57) ABSTRACT

A conductor arrangement for an inductive power transfer wherein a conductor is arranged so as to form at least a first subwinding and a second subwinding that are arranged next to one another, such that at least one conductor segment of each of the first and second subwinding run alongside one another in a first conductor bundle of the conductor arrangement. In the first conductor bundle, the first subwinding and the second subwinding are connected to one another via a first connecting conductor segment that crosses at least one further conductor segment of the conductor arrangement. A system for an inductive power transfer having at least two respective conductor arrangements, and a method for manufacturing a conductor arrangement are also disclosed.

16 Claims, 5 Drawing Sheets

(51) Int. Cl.
    *B60L 53/12*     (2019.01)
    *H01F 27/38*    (2006.01)
    *H01F 41/04*    (2006.01)

(56) References Cited

U.S. PATENT DOCUMENTS

| | | | |
|---|---|---|---|
| 2011/0248574 A1* | 10/2011 | Yamamoto | H02J 50/50 |
| | | | 307/104 |
| 2012/0146580 A1* | 6/2012 | Kitamura | H02J 50/12 |
| | | | 320/108 |
| 2014/0318912 A1* | 10/2014 | Woronowicz | H02J 50/005 |
| | | | 191/10 |
| 2015/0054350 A1* | 2/2015 | Covic | H01F 27/2871 |
| | | | 242/360 |
| 2015/0084406 A1* | 3/2015 | Czainski | H01F 38/14 |
| | | | 307/9.1 |
| 2016/0204618 A1* | 7/2016 | Samuelsson | H01F 38/14 |
| | | | 307/104 |
| 2018/0130599 A1* | 5/2018 | Yun | H02J 50/12 |
| 2019/0006884 A1* | 1/2019 | Yuasa | H02J 50/402 |
| 2019/0199132 A1* | 6/2019 | Ota | H01F 27/28 |
| 2020/0148067 A1* | 5/2020 | Ekbäck | H01F 27/2871 |

FOREIGN PATENT DOCUMENTS

| | | | | |
|---|---|---|---|---|
| GB | 2485616 A | | 5/2012 | |
| GB | 2505516 A | | 5/2014 | |
| JP | 2013184586 A | * | 9/2013 | ............. B60L 5/005 |
| JP | 2013247822 A | * | 12/2013 | |
| JP | 2013247822 A | | 12/2013 | |
| WO | 2013133254 A1 | | 9/2013 | |
| WO | 2013133255 A1 | | 9/2013 | |
| WO | WO-2013133254 A1 | * | 9/2013 | ............. H02J 50/10 |
| WO | WO-2015137431 A1 | * | 9/2015 | ............. H01F 38/14 |
| WO | 2016207291 A1 | | 12/2016 | |

* cited by examiner

CONDUCTOR ARRANGEMENT, SYSTEM AND METHODS FOR AN INDUCTIVE POWER TRANSFER

CROSS-REFERENCE TO RELATED APPLICATIONS

This application is the United States national phase of International Application No. PCT/EP2019/071142 filed Aug. 6, 2019, and claims priority to United Kingdom Patent Application No. 1813803.2 filed Aug. 24, 2018, the disclosures of which are hereby incorporated by reference in their entirety.

BACKGROUND OF THE INVENTION

Field of the Invention

The invention relates to a conductor arrangement, a system and methods for an inductive power transfer. In particular, the invention relates to a conductor arrangement, a system and methods for an inductive power transfer from a stationary unit to a vehicle, such as a train or a car.

Description of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is typically performed using at least two sets of conductor arrangements that are each formed into a winding structure. A conductor arrangement may comprise a plurality of sub-windings or poles and/or a plurality of turns or loops. A first set may be installed on the ground or in the surroundings (primary winding structure) and can be fed by a wayside power converter (WPC). The second set of windings (secondary winding structure) is installed on the vehicle. For example, the second set of windings can be attached underneath the vehicle, in the case of trams under some of its wagons. For an automobile it can be attached to the vehicle chassis. The secondary winding structure(s) or, generally, the secondary side is often referred to as pick-up-arrangement or receiver or is a part thereof. The primary winding structure(s) and the secondary winding structure(s) form a high frequency transformer to transfer electric energy to the vehicle. This can be done in a static state (when there is no movement of the vehicle) and in a dynamic state (when the vehicle moves).

Known conductor arrangements, however, suffer from a number of disadvantages.

For example, inductive power transfer systems may suffer from local eddy currents and stray magnetic fields leading to unwanted magnetic losses. This may generally be referred to as electromagnetic disturbances which are caused within the inductive power transfer system or the conductor arrangement used therein. As a result, heat generation in the participating components may increase and the efficiency of the inductive power transfer may decrease.

A further problem is the continuous increase of the electric potential along the extension of the conductors (e.g. the electric lines or cables) within a conductor arrangement. This increase may result from increasing (cumulated) electric losses or an increasing (cumulated) electric resistance along the length of the conductor.

In cases in which a conductor arrangement comprises adjacent conductor segments running alongside one another, large electric potential difference may thus occur between such adjacent conductor segments. This may lead to high voltages occurring between the adjacent conductor segments which may even pierce through the insulation of said segments and create electrical short-circuits. This phenomenon may even occur when there are only two subwindings or poles within a conductor arrangement having as little as one turn or, differently put, 1 loop, for example, if the induced or applied voltage is too high. To compensate for this problem, it is a common practice to arrange additional electric components such as capacitors between the poles or subwindings of a conductor arrangement and thus limit the potential values along the conductor segments to acceptable values. This, however, increases the size and the costs of the conductor arrangement and might affect its symmetry and thus the regularity of the generated electromagnetic field.

In commonly found embodiments each subwinding (often referred to as pole) of an inductor is designed as similar and/or symmetrical to other subwindings as possible to allow for the generation of a homogenous magnetic field. Each of the subwindings comprises an input connector and an output connector, the connectors being for example terminals on a printed circuit board or on a specially designed connector plate located below the winding unit. The output connector of a first subwinding is connected to the input connector of the next subwinding through an electrical connection, thus connecting the subwindings in series. The connectors and/or the electrical connection usually have to be positioned outside of a plane in which the subwindings extend, thereby leading to the generation of an irregular electromagnetic field. Thus, additional space and in some cases further shielding is required to cope with said irregular electromagnetic field. This is even more critical when more than one conductor arrangement is provided, e.g. to energise each conductor arrangement with a specific operating current in order to produce an alternating electromagnetic field.

Moreover, for subwindings having more than one loop, the arrangement of the electrical conductor in a spiral form is a commonly encountered embodiment. As per usual in this case, an input connector serves as an outer starting point of the spiral. The electrical conductor is guided inwards in a spiral fashion and terminates after the desired amounts of turns at an output connector, thus, forming the subwinding. In the case of two or more poles, the two or more poles are then connected in series to each other wherein an output connector from a first subwinding is connected to an input connector of a second subwinding. In some cases, the connectors are implemented by simply welding together the two open ends of the respective conductors of said subwindings. In cases of only two poles, the connectors may be implemented by laying out the wires in such a manner that the lines form two attached continuous spirals. However, this method cannot be applied when three or more subwindings are implemented without diverting from the plain spiral form of each subwinding. Again, this may lead to an irregular electromagnetic field being produced.

SUMMARY OF THE INVENTION

It is an object of the invention to provide a conductor arrangement for an inductive power transfer and a method of manufacturing and operating same, which allows for a safe and efficient inductive power transfer, preferably at a limited size and limited costs.

This object is solved by a device, a system and the methods described herein. Moreover, the features mentioned in the above introductory part of the description may individually or in any combination thereof also be provided in the presently disclosed solution, if not mentioned or evident otherwise.

According to a basic idea of the invention, a conductor arrangement and a system comprising such a conductor arrangement are proposed which comprise subwindings with crossing conductor segments. Differently put, the conductor arrangement comprises at least two conductor segments which cross each other e.g. by one being laid across the other. Moreover, it is generally contemplated to provide a respective conductor-crossing in or as a segment which connects two subwindings that are arranged next to one another (e.g. thereby connecting them in series). It has been discovered that this allows for a formation of subwindings which is advantageous in numerous ways. For example, this allows for reducing electric potential differences between adjacent conductor segments and in particular adjacent conductor segments belonging to different subwindings. As a consequence, additional components such as capacitors may be omitted.

Moreover, due to the crossing conductor segments, more degrees of freedom are provided for laying the conductor and positioning connectors or connecting terminals in a preferable manner (e.g. in such a way so as to achieve a desired regularity of the generated electromagnetic field)

More precisely, a conductor arrangement for an inductive power transfer is suggested, wherein a conductor is arranged (e.g. by being laid in or according to a defined course) so as to form at least a first and a second subwinding that are arranged next to one another (e.g. when being viewed along a longitudinal axis of the conductor arrangement), such that at least one conductor arrangement of each of the first and second subwinding run alongside and/or in parallel to one another in (or, differently put, thereby at least partially forming) a first conductor bundle of the conductor arrangement, wherein in said first conductor bundle, the first subwinding and the second subwinding are connected to one another via a first connecting conductor segment that crosses at least one further conductor segment of the conductor arrangement.

A conductor may in the context of the present disclosure be an electrically conducting element, such as a cable, a (conductor) strand (or a plurality of strands running alongside one another), an electric line and in particular a phase line. In general, a conductor may be an electrically conducting member which is configured (e.g. by being arranged and/or electrically connected) to conduct electricity from one defined point to another defined point, said point being preferably located at opposite ends of the conductor. Additionally or alternatively, a conductor may, in the context of the present disclosure, refer to an electrically conducting member being generally elongated and/or extending along a longitudinal axis which, as a result of arranging the conductor to form the conductor arrangement, may have a non-straight course (e.g. a bent, wound or curved course). Generally, the conductor may be arranged in a looped, bent or wound manner so as to form the at least first and second subwinding as well as any additional subwindings discussed below.

The conductor arrangement may form at least one winding structure of a primary winding structure which may comprise a plurality of respective winding structures and/or may generally be referred to as a primary unit. Said primary winding structure may comprise a plurality of conductor arrangements, e.g. three conductor arrangements, each of which being preferably shaped in the presently disclosed manner. The conductor arrangement and/or the primary winding structure may be used to inductively charge a vehicle. Additionally or alternatively, the conductor arrangement and/or the primary winding structure may be part of a so-called inductive power transfer pad or charging pad, which may be installed on the surface of a road, track, route and/or a parking space or integrated within a surface of such a structure. The primary winding structure may be configured to generate an preferably alternating (electro-) magnetic field when being energised or supplied with operating currents. Said (electro-) magnetic field can be received by one or more secondary winding structure(s).

Alternatively, the conductor arrangement may form at least one winding structure of a secondary winding structure which may comprise a plurality of respective winding structures and/or may generally be referred to as a secondary unit. The secondary winding structure may generally be configured to receive an electromagnetic field, generally put, the inductively transferred power.

In the context of an inductive power transfer, the conductor arrangement may be generally located at a so-called primary side which is located separately from the unit or vehicle to which power is to be transferred to. Locating the conductor arrangement at a secondary side (e.g. at the unit or vehicle to which power is to be transferred to) is, however, possible as well.

In general, a subwinding may comprise at least one fully or largely closed loop or coil formed by the conductor. For example, an opening angle of the loop or coil may be equal to or less than 90°, thus been largely closed. The subwinding may comprise a plurality of fully or largely closed turns (e.g. at least two per subwinding). Opening angles or sections of said turns may be positioned so as to not overlap one another (e.g. by being positioned at different and preferably opposite sides of the subwinding).

The conductor arrangement may have a longitudinal axis and preferably a lateral axis extending at an angle and e.g. orthogonally to said longitudinal axis. At least the first and second and preferably each of the subwindings may be arranged next to one another and/or connected in series along said longitudinal axis (e.g. when viewing the conductor arrangement along said longitudinal axis). For example, the subwindings may be arranged with a predetermined displacement from or distance to one another along said longitudinal axis. This displacement may be referred to as a pitch between the subwinding structures. Differently put, the subwindings may not overlap along said longitudinal axis and/or the conductor arrangement may have sections along said longitudinal axis in which only one of the subwindings extends and preferably one respective section per subwinding. In one example, the subwindings do not overlap along said longitudinal axis, but may be connected to one another by connecting conductor segments as detailed below. The longitudinal axis may also be referred to as an axis along which poles of the conductor arrangement are located.

Each subwinding may be shaped in a rectangular or oval manner. Each subwinding may provide one pole and especially one pole of a phase line which may be used as a conductor of the conductor arrangement. Each subwinding may have two pairs of sections being arranged oppositely and/or parallel to one another. Additionally or alternatively, each subwinding may have two (in comparison) longer and two (in comparison) shorter sections, said longer sections extending preferably oppositely and/or in parallel to one another, the same preferably applying to the shorter sections.

Each subwinding may have active sections which, for example, define or dominate the characteristics of a subwinding with regard to electric power transfer. Additionally or alternatively, the active sections may be configured to, during the inductive power transfer, produce a resonating electromagnetic field by interacting (and/or cooperating) with a further conductor arrangement (that is e.g. positioned in the respective other of the first and second winding structure). In general, the active sections may be formed by or provide at least part of the longer sections of a subwinding and/or of so-called pole legs of a subwinding. The further sections may be formed by or provide the shorter sections of a subwinding and/or so-called pole heads of a subwinding. The active sections may extend along the lateral axis of the conductor arrangement and/or the further sections may extend along the longitudinal axis of the conductor arrangement.

Generally speaking, each subwinding structure may thus have sections or segments extending along and/or in parallel to the longitudinal and lateral axis (in particular two sections along the longitudinal and two segments along the lateral axis). The sections extending parallel to the lateral axis can also be referred to as active sections.

The subwindings may be provided as flat structures and/or be arranged within and/or in parallel to a common two-dimensional plane. Said plane may comprise the abovementioned lateral and longitudinal axes of the conductor arrangement. It is to be understood that if extending within a common plane, said plane may have a limited thickness which may e.g. be defined by a thickness of the conductor (e.g. a diameter thereof). On the other hand, at least at a position of a line crossing, the thickness of the plane may be defined by twice the thickness of the conductor or its diameter, e.g. since at a respective crossing two conductor segments are placed on top of one another.

Preferably, a line crossing is generally marked by a direct contact between the conductor segments which cross each other.

In general, the lateral and longitudinal axes can both be oriented perpendicularly to a vertical axis, said vertical axis being preferably oriented towards the other of a first and secondary winding structure and/or extending in parallel to a main direction of the power transfer. Also, said vertical axis may be oriented along the direction of gravitational forces, but is preferably oriented oppositely thereto. Directional terms used within the present disclosure referring to a direction such as "above", "under", "beside" or their respective equivalents can relate to the aforementioned longitudinal, lateral and vertical axes.

Due to being arranged next to one another, the subwindings may have segments extending alongside one another (e.g. one segment of the first and one segment of the second subwinding). The respective segments may be two longer segments, two segments extending along the longitudinal axis, two pole legs or two active sections. Also, said segments may face each other or, differently put, be comprised by or form at least part of a side of each subwinding, said sides facing each other. Moreover, the subwindings may have two segments and/or sides facing away from one another (e.g. the further longer segments, further active sections, further segments extending along the longitudinal axis or further pole legs which do not face each other). Additionally or alternatively, each subwinding may have two segments extending at an angle to the segments extending alongside one another, said two segments e.g. forming pole heads, being shorter segments and/or extending along the longitudinal axis. Also, these segments may generally connect the further segments of a subwinding so as to form a substantially rectangular or oval shape.

A conductor bundle may in the present disclosure, generally denote an arrangement of adjacent and/or parallel conductor segments. Preferably, a conductor bundle comprises conductor segments belonging to two different subwindings e.g. at least two conductor segments, which belong to different subwindings. In one example, the conductor bundle comprises three or four conductor segments, two of which belonging to the first and to of which (or one) belonging to the second subwinding or vice versa. The conductor segments of the conductor bundle may comprise any of the above-mentioned conductor segments of the subwindings running alongside one another, e.g. the active sections, longer segments, pole legs or segments running along the lateral axis.

The first conductor bundle may comprise further segments apart from the segments of the first and second subwinding running alongside one another. Specifically, the first conductor bundle may e.g. comprise the first connecting conductor segment. Said first connecting conductor segment may electrically connect the first and second subwinding, e.g. by connecting the pole leg of one subwinding to the winding head of the other subwinding.

The first connecting conductor segment (as well as a possible further e.g. second connecting conductor segment discussed below) may generally extend at an angle to the longitudinal axis, to the lateral axis and/or to at least one further conductor segment within the conductor bundle, e.g. at an angle of at least 20°. Additionally or alternatively, a connecting conductor segment may cross a further conductor segment of the conductor arrangement while enclosing an angle of at least 30°, 45° or 60° therewith. A connecting conductor segment may fully or only in part extend within a conductor bundle. For example, a segment following the conductor crossing may extend out of a conductor bundle towards and in order to connect to one of the subwindings. In the context of this disclosure, a conductor crossing generally refers to a point or area of the conductor arrangement at which two conductor segments cross each other. The first connecting conductor segment may be part of a connecting conductor crossing discussed below.

According to a further embodiment, the at least one crossed conductor segment is part of the first or second subwinding and/or extends within the first conductor bundle. The crossed conductor segment may extend along the longitudinal axis or at an angle thereto. For example, the crossed conductor segment may extend at an angle to the longitudinal and lateral axes but with a different orientation than the connecting conductor segment. In one example, the crossed conductor segment and the connecting conductor segment enclose an angle of up to 40°, up to 60° or up to 90° or up to 120° with one another. If more than one conductor segment is crossed, any of the above features may apply to any and in particular to all of the crossed conductor segments.

In a further embodiment, the first connecting conductor segment terminates at or close to a conductor segment of one of the subwindings that runs at an angle (e.g. orthogonally)

to the first conductor bundle. Depending on the viewing direction, it may also be stated that the first connecting conductor segment starts at or close to a respective conductor segment. Differently put, the first connecting conductor segment may connect to one of the subwindings in a position at or close to a conductor segment running at an angle (e.g. orthogonally) to the first conductor bundle. Said conductor segment may be part of or form a winding head of the subwinding. A termination or connection close to the respective conductor segment may include a distance between a termination- or connection point to said conductor segment of less than 0.3 m, less than 0.2 m, less than 0.1 m or less than 0.05 m e.g. along the lateral axis. Additionally or alternatively, the distance may amount to less than 10% or less then 5% of the length of the first conductor bundle along the lateral axis.

By positioning the first connecting conductor segment in the above manner, said crossing conductor segment may be positioned close to a winding head of at least one or both of the subwinding(s) and thus at an edge portion of active sections of the subwinding(s). Accordingly, disturbing influences associated with the conductor crossing or line crossing, such as eddy currents, may be positioned at the edge or at a distance to an area which is substantial for achieving (e.g. dominantly contributes to) an efficient inductive power transfer.

According to a further aspect, each subwinding forms a pole of the conductor arrangement and comprises at least first and second pole leg and at least a first and second pole head. Preferably, the first conductor bundle comprises one pole leg of each subwinding. A pole may generally be an area or region of the conductor arrangement in which, when being energised by a current (and in particular an alternating current), a defined electromagnetic behaviour may the generated (e.g. by forming a defined pole of the electromagnetic field generated by said conductor arrangement). The pole legs may correspond to or comprise the above discussed conductor segments extending along a longitudinal axis, the longer conductor segments and/or the active sections of the conductor arrangement. The winding heads may correspond to or comprise the above discussed conductor segments extending along a lateral axis, the shorter conductor segments and/or the further segments of the conductor arrangement apart from the active sections. It is to be understood that the pole legs may generally extend in parallel to one another and form opposite sides of a respective subwinding, the same applying to the winding heads. The first conductor bundle may thus also be referred to as a first pole leg bundle.

In this connection, the conductor segment that is crossed by the first conductor connecting segment may form part of or directly connect to (or terminate at or close to) a pole leg of one of the first or second subwinding. This way, the connection of the subwindings by way of the first connecting conductor segment may be realised in a compact manner and/or within the first conductor bundle. Also, this allows for placing the conductor crossing close to one or both of the winding heads and/or at an edge portion of the pole legs or active sections. The term "close" may imply a distance as discussed above with respect to the first connecting conductor segment terminating close to a conductor segment running at an angle to the first conductor bundle.

According to a further aspect, the first and second subwinding are arranged next to one another along a longitudinal axis and the first conductor bundle extends at an angle to and in particular orthogonally to said longitudinal axis. As noted above, the arrangement next to one another along the longitudinal axis may refer to a respective arrangement when viewing the conductor arrangement along said longitudinal axis and/or result in or be equivalent to a non-overlapping arrangement of the subwindings along said longitudinal axis. In general, any overlap between subwindings of the conductor arrangement may be avoided (e.g. also along the lateral axis), such that the only conductor overlaps within the conductor arrangement may result from the conductor crossings.

In a further embodiment, a position at which the conductor segments cross each other is located at or near an (outer) edge portion of the first conductor bundle. Said edge portion may refer to opposite (e.g. upper and lower) edges or ends of the first conductor bundle (e.g. when being viewed along the lateral axis). The term "near" may imply a distance to said edge portion of not more than 30 cm, not more than 20 cm, not more than 10 cm or not more than 5 cm e.g. along the lateral axis. Additionally or alternatively, a distance to said edge portion may amount to less than 20% or less than 10% of a length of the first conductor bundle along the lateral axis. This embodiment may help to position the conductor crossings and the electromagnetic disturbances associated therewith at the edges or out of a region (e.g. out of or at the edges of the active sections) in which an efficient inductive power transfer can be provided by means of the generated electromagnetic field.

Differently put, a position at which the conductor segments cross each other may thus be positioned near or within a transitional area between the first conductor bundle and a section of the conductor arrangement extending at an angle thereto. Typical this ly, said transitional area comprises at least one corner region of one of the subwindings, wherein in said corner region e.g. a pole leg and a winding head are connected to one another.

As noted above, a subwinding may have a plurality of turns, thus also comprising a plurality of conductor segments running in parallel to one another (e.g. a plurality of pole legs or winding heads). The conductor segments forming an outermost conductor segment (e.g. when viewed from a geometric center of a subwinding) may be referred to as an outer conductor segment. The outer conductor segments may thus generally face or form a boundary to the surroundings (in particular when forming a winding head) and/or to an adjacent subwinding (in particular when forming a pole leg). Conductor segments which do not form a respective outer conductor segment may be referred to as an inner or interior conductor segments.

According to a further aspect, at least one of the subwindings of the conductor arrangement comprises an internal conductor crossing in (or at) which two conductor segments of said subwinding cross each other. The term "internal" may imply that the conductor segments crossing each other belong to the same subwinding, e.g. each form a conductor segment of a pole leg of said subwinding, wherein said pole legs preferably extend in parallel to one another. The internal conductor crossing may be positioned within a conductor bundle (e.g. the first conductor bundle or the second conductor bundle discussed below). The internal conductor crossing may result in an outer conductor segment of the subwinding becoming (or being connected to) an inner conductor segment and an inner conductor segment becoming (or being connected to) an outer conductor segment, or vice versa. Additionally or alternatively, the internal conductor crossing may include that the crossing conductor segments extend at an angle to the longitudinal and/or lateral axis, at least in the area of the conductor crossing. Segments before and after the conductor crossing, on the other hand, may extend along the longitudinal and/or lateral axis.

The internal conductor crossing may e.g. help to limit potential differences between adjacent conductor segments (e.g. within a conductor bundle). Additionally or alternatively, it may enable to position a connector for connecting to a voltage source in a desired manner, e.g. by providing additional degrees of freedom for laying the conductor with a subwinding.

With regard to positioning the internal conductor crossing, any of the above or below remarks, features and aspects relating to positioning the conductor crossings for connecting the subwindings (i.e. the connecting conductor segments) may equally apply. In particular, the internal conductor crossing may be positioned at or close to a winding head or an edge portion of a conductor bundle. Again, this may help to limit disturbances of the generated electromagnetic field which may result from the crossing the conductor segments.

According to further development, the first and second subwinding each comprise at least one inner and outer conductor segment and wherein the first connecting conductor segment connects an outer conductor segment of the first subwinding to an inner conductor segment of the second subwinding or vice versa. Differently put, the first connecting conductor segment may terminate at an outer conductor segment of the first subwinding and at an inner conductor segment of the second subwinding and/or connect these conductor segments to one another. The term vice versa means that alternatively an inner conductor segment of the first subwinding and an outer conductor segment of the second subwinding may be connected by the first connecting conductor segment (and/or the first connecting conductor segment terminating thereat or extending therebetween). This development may help to reduce potential differences between adjacent conductor segments in the conductor bundle, thereby limiting electromagnetic disturbances on the inductive power transfer.

According to a further aspect, the conductor arrangement may comprise a third subwinding that is arranged next to (e.g. directly adjacent to) and/or connected to (e.g. directly connected to, i.e. without a further subwinding therebetween) one of the first and second subwinding. Again, the third subwinding may form a pole of the conductor arrangement. It may generally comprise any of the features discussed above with respect to the first and second subwinding, if not evident or mentioned otherwise. For example, the third subwinding may comprise two pole legs and to winding heads and/or multiple turns and thus inner and outer conductor segments.

In one example, the third subwinding is free of an internal conductor crossing and/or directly connected to one of the further subwindings without a connecting conductor segment crossing further conductor segments. This helps to limit electromagnetic disturbances associated with crossing conductors. Also, the third subwinding may comprise a connector for connecting to a voltage source. Moreover, a connecting conductor segment connecting the third subwinding directly to one of the further subwindings may extend at an angle to the longitudinal and/or lateral axis (e.g. at an angle of not more than 45° or not more than 60°). This may help to keep the conductor arrangement compact and limit distances between adjacent conductor segment in a conductor bundle.

On the other hand, the third subwinding and the first or second subwinding arranged next thereto may be connected to one another via a connecting conductor crossing in which it least two conductor segments of the conductor arrangement cross each other. For example, the connecting conductor crossing may comprise a second connecting conductor segment crossing at least one and, in one example, to further conductor segments of the conductor arrangement. Preferably, the second connecting conductor segment extends between an inner conductor segment of the third subwinding an outer conductor segment of the subwinding next thereto or, differently put, terminate or start at these conductor segments or connect them with one another. As noted above, this may include crossing at least one and preferably two further conductor segments of the conductor arrangement (e.g. conductor segments of the third and that first or second subwinding arranged next thereto). Accordingly, the second connecting conductor segment may be a conductor segment of the connecting conductor crossing which crosses further conductor segments. The second connecting conductor segment may generally be configured according to any of the variants previously or subsequently discussed with respect to the first connecting conductor segment. For example, the second connecting conductor segment may extent between a pole leg and a winding head of the subwindings and/or at an angle to the longitudinal as well as lateral axis.

In general, the third subwinding and the subwinding next thereto may comprise conductor segments running alongside one another in a second conductor bundle. Any of the previously or subsequently discussed aspects with respect to the first conductor bundle may also apply to the second conductor bundle. In particular, the second conductor bundle may extend orthogonally to a longitudinal axis of the conductor arrangement and may comprise adjacent conductor segments of the respective subwindings and/or conductor segments lying oppositely to and/or facing one another. The second connecting conductor segment (and/or the connecting conductor crossing) may be positioned and/or at least partially extent within the second conductor bundle. Also, the second connecting conductor segment may be positioned at or near an edge portion of a conductor bundle formed by at least conductor segment of the third subwinding and at least one conductor segment of the subwinding directly next thereto.

At least one of the crossed conductor segments in the connecting conductor crossing may be a conductor segment belonging to a pole leg of the third subwinding or the subwinding next thereto. In one example, the second connecting conductor segment crosses two further conductor segments, said conductor segments belonging to or, differently put, forming a pole leg of the third subwinding and a pole leg of the subwinding next thereto. The at least one crossed conductor segment may extend at an angle to the longitudinal and/or lateral axis and enclose an angle of up to 40°, up to 60° or up to 90° or up to 120° with the second connecting conductor segment.

Further, the second connecting conductor segment may extend between (and/or connect or terminate at) an inner conductor segment of the third subwinding and an outer conductor segment of the subwinding next thereto or vice versa (i.e. between an outer conductor segment of the third subwinding and the inner conductor segment of the subwinding next thereto). Within the third subwinding and starting from the point of connecting to the connecting conductor crossing, the conductor may run from the inside to the outside forming at least one and preferably two turns of the third subwinding. Following that, it may cross the second connecting conductor segment in order to connect to the subwinding arranged next to the third subwinding. Overall, the above connection of inner and outer conductor segment thus allows for a simple to produce and electromagnetically preferable (i.e. causing limited electromagnetic disturbances) structure of and connection of the third subwinding to the one position next thereto.

In a further embodiment, the one of the first and second subwinding arranged next to the third subwinding segment comprises an internal conductor crossing, and wherein by means of said internal conductor crossing an inner conductor segment of said subwinding is connected to (or becomes an/or extends between) an outer conductor segment of said subwinding, said outer conductor segment connecting to the third subwinding. Differently put, the internal conductor crossing may extend between and thus connect an inner conductor segment and an outer conductor segment, the outer conductor segment then terminating at (and/or connecting to) the third subwinding. In addition, by means of said internal conductor crossing, an inner conductor segment may connect to an outer conductor segment of this subwinding. In other words, two conductor segments of the respective subwinding may cross each other at or via the internal conductor crossing, so that an inner conductor segment is continued as an outer conductor segment (or vice versa, depending on the directional viewpoint) and an outer conductor segment is continued as an inner conductor segment (or vice versa, depending on the directional viewpoint).

In a further embodiment, the conductor extends within the conductor arrangement (e.g. between its first and second connector) as a continuous member and/or a continuous sequence of conductor segments (e.g. being free of interruptions or gaps but formed as a continuous, one-piece or segmented strand, preferably with numerous bents or curves). For example, a plurality of conductor segments may be provided which are connected to one another by joining technologies such as welding or soldering. In turn, the conductor arrangement may be free of additional electronic components, such as capacitors, so that the conductor may e.g. be laid as a continuous or multi-segment member having a bent and/or wound course to form the subwindings.

The above embodiment is advantageous in terms of costs and size and, in particular, may be enabled due to providing further degrees of freedom by way of the conductor crossings disclosed herein. For example, said conductor crossings may be positioned such that electric potential differences between adjacent conductor segments (e.g. conductor segments belonging to different subwindings and/or being positioned in a common conductor bundle) our reduced. Accordingly, it may not be necessary to include capacitors in between the subwindings to reduce respective potential differences, so that a continuous conductor can be used.

In a further embodiment, one of the subwindings (e.g. the first, second or a possible third subwinding) of the conductor arrangement comprises a first connector (or connecting terminal) for electrically connecting to a first pole of a voltage source and a further subwinding (e.g. the first, second or a possible third subwinding which does not comprise the first connector) of the conductor arrangement comprises a second connector (or connecting terminal) for electrically connecting to a second pole of the voltage source and wherein the conductor arrangement is configured to conduct a current between the first and second connector. The first and second connector may be provided by and/or comprise an input circuitry or an output circuitry (e.g. the first connector being provided by or comprising the input circuitry and the second connector being provided by or comprising the output circuitry, or vice versa). The first and the second pole may be different from one another, e.g. the first being a positive and the second being a negative pole, or vice versa. Further, it is to be understood that the electric connection to the poles of the voltage source may not necessarily include a direct physical connection, but only an indirect connection via further intermediate components (e.g. via an AC current generator).

Due to the need of connecting the conductor to a voltage source, known conductor arrangements can often not be configured with a preferred symmetry (e.g. with subwindings that not particularly are symmetric with respect to both of the longitudinal and lateral axis). This lack of symmetry may result in a lack of symmetry of the generated electromagnetic field, thereby decreasing the efficiency of the inductive power transfer.

Due to providing the above discussed crossing conductor segments, more degrees of freedom are available for arranging the connectors in a desired manner, thereby limiting negative effects on the symmetry.

For example, the connectors may be positioned such that an area exists, in which the subwindings are marked by a desired symmetry and in particular are symmetric with respect to both of the longitudinal and lateral axis. Said area may be rectangularly shaped. Additionally or alternatively, the connectors may thus be placed such that at least part of the first and/or second conductor bundle (e.g. at least one conductor segment belonging to one subwinding and at least a further conductor bundle belonging to a further subwinding in such a bundle) comprise straight conductor segments running in parallel to one another, e.g. along at least two thirds or three quarters of the length of said conductor bundle. This as well helps to improve the efficiency of the inductive power transfer.

In this context, the first and second connectors may be positioned at a substantially similar height (e.g. along the lateral axis) and/or may be positioned such that a distance between the connectors along a lateral axis of the conductor arrangement that extends orthogonally to the longitudinal axis is less than 0.3 meters, less than 0.15 meters or less than 0.05 meters. This way, the lack of symmetry resulting from providing the connectors as well as the negative influences on the (symmetry of the) generated electromagnetic field and efficiency of the inductive power transfer may be limited. Also, this may allow for placing the connectors above or in gaps between magnetically conducting elements discussed below.

According to a further aspect, the conductor arrangement further comprises an arrangement of magnetically conducting elements (e.g. a ferrite arrangement or an arrangement of flux guiding elements) and the first and second connector are positioned in or above an area having a locally limited (and in particular locally decreased) magnetic conductivity. The area having the locally limited magnetic conductivity may e.g. be formed by and/or comprise a gap between magnetically conducting elements or a recess within one magnetically conducting element. The magnetically conducting elements may, in particular with respect to previously discussed vertical axis, be positioned below the conductor and its subwindings and/or at a side of the subwindings facing away from the unit which power is inductively to be transferred or from which power is inductively received. Thus, the first and second connector may be positioned above a respective area.

Differently put, the first and second connector may be positioned at a position or region having similar coordinates with respect to the longitudinal and lateral axis as a respective area of the arrangement of magnetically conducting elements. When positioning the connectors accordingly, amplifications of the electromagnetic disturbances associated with the connectors (e.g. due to the lack of symmetry introduced thereby) by or through the magnetically conducting elements may be limited.

Additionally or alternatively, the conductor arrangement may further comprise an arrangement of one or more magnetically conducting elements (e.g. a ferrite arrangement or an arrangement of flux guiding elements) and wherein a position of at least one conductor crossing of the conductor arrangement is located in or above an area having a locally limited (and in particular locally decreased) magnetic conductivity. The arrangement of magnetically conducting elements as well as the area with the locally limited magnetic conductivity may be configured according to any of the above or below aspects. An advantage of this embodiment is that and amplification of the electromagnetic disturbances such as eddy currents associated with a conductor crossing by or this through the arrangement of magnetically conducting elements may be limited.

At least one magnetically conducting element can be arranged at least partially or fully within the plane in which the conductor arrangement or at least one of its subwindings is arranged. In particular, said magnetically conducting element can be arranged within or can extend into a volume or area enclosed by one subwinding structure.

The magnetically conducting element(s) or the arrangement can extend and/or be oriented along or in parallel to the longitudinal axis. In particular, the at least one magnetically conducting element can be a strip-like or elongated element. In other words, the at least one magnetically conducting element can be a bar element, e.g. a ferrite bar. This advantageously allows decreasing the magnetic flux extending away from the conductor arrangement in an unwanted direction.

A bar element can have a constant height along its length. In this case, the bar element can have a cuboid shape. Alternatively, a bar element can have a varying height along its length. In particular, a bar element can have at least one section with a constant height and at least one section with an increasing height, thereby e.g. forming a recess. The height can be measured along the vertical axis of the primary winding structure.

Further, the arrangement of magnetically conducting elements can comprise multiple bar elements. These bar elements can be arranged such that the bar elements each extend and/or oriented along or in parallel to the longitudinal axis. Multiple bar elements can be arranged along or in parallel to a straight line that runs parallel to the longitudinal axis, wherein these multiple bar elements can abut or overlap at front end or rear e this nd sections of the bar elements. Such an arrangement can also be referred to as row of bar elements.

It is possible that the arrangement of multiple bar elements comprises multiple rows, wherein each row comprises one or multiple bar elements. Between adjacent rows, gaps may be formed which may equally extend along the longitudinal axis.

Further, the arrangement of magnetically conducting elements can comprise multiple rows of at least one magnetically conductive element, wherein a non-zero gap between two adjacent or successive rows is provided along the lateral direction. Each row comprises one or multiple bar elements extending along a line parallel to the longitudinal axis. The rows are spaced apart from another along or parallel to the lateral axis. The distance between two adjacent rows can be chosen from an interval of 0 mm (exclusive) to 50 mm (inclusive), preferably to 30 mm (inclusive). The non-zero gap advantageously allows to adjust or to provide a desired flux density within the volume or area enclosed by the subwinding structure it may further provide an area of locally limited magnetic conductivity.

Further, at least two magnetically conductive elements can overlap each other. In particular, the at least two bar elements can overlap each other at a front end or rear end section of the bar elements. More particular, two successive bar elements of one row of multiple bar elements can overlap. This can mean that the at least two bar elements are arranged at different vertical positions along the aforementioned vertical axis.

Further, the at least one magnetically conducting element or an arrangement of magnetically conducting elements can provide a recess. The recess can receive at least a section of a winding structure, in particular of a subwinding structure. Further in particular, the recess can be arranged and/or designed in order to receive a section of a winding structure extending along or parallel to the lateral axis. More particular, the recess can be designed and/or arranged such that a section of a winding structure at the transition from one subwinding structure to the successive subwinding structure along the longitudinal axis (e.g. a connecting conductor segment) can be arranged within above the recess.

If an arrangement of multiple magnetically conductive elements comprises one or multiple rows of more than one magnetically conductive element, the magnetically conductive elements of one row can be arranged such that a recess is provided. The recess can e.g. be provided if only end sections of a second magnetically conductive element in the row, in particular an elongated element, overlap end sections of a first and a third magnetically conductive element in the row, respectively. The recess can then be provided between the first and the third magnetically conductive element. The width of the recess can be adapted to the width of the section of the primary winding structure to be received. In other words, magnetically conducting elements of an arrangement of multiple magnetically conductive elements can be arranged in a row. In this case, multiple magnetically conductive elements can be arranged successively along the longitudinal axis of the primary winding structure. Further, at least two successive magnetically conductive elements are aligned with a vertical offset to one another. This can mean that a non-zero distance between the longitudinal axes of two successive magnetically conductive elements is provided along the vertical axis of the primary winding structure. Further, there can be no vertical offset between every second magnetically conductive element of the row. The vertical offset can provide the recess. This advantageously further reduces an installation space requirement and increases the magnetic coupling between the primary and secondary winding structure.

Further, at least one section of at least one magnetically conductive element can extend into one subwinding structure. This can mean that the at least one section extends into a volume or area enclosed by the subwinding structure. This advantageously further reduces an installation space requirement.

In other words, at least one section of at least one magnetically conductive element can be arranged within the volume or area enclosed by a subwinding structure. A height of a magnetically conductive element which is arranged within the volume enclosed by a subwinding structure can be larger than, equal to or smaller than the height of the subwinding structure. This advantageously further reduces an installation space requirement. Further, the arrangement of a magnetically conductive element within the volume advantageously increases the amount of field lines of the alternating electromagnetic field which extend through said volume as the magnetically conductive element serves as a field collector.

It is possible that 30% to 70%, preferably 45% to 55%, of the volume enclosed by the subwinding structure is filled with one or multiple magnetically conductive elements.

If an arrangement of multiple magnetically conductive elements comprises one or multiple rows of more than one magnetically conductive element, the magnetically conductive elements of one row can be arranged such that at least one section of the winding structure is arranged within the recess provided by the row, wherein a section of the row is arranged within the volume or area enclosed by a subwinding structure.

It is, for instance, possible that one row comprises upper magnetically conductive elements and at least one or multiple lower magnetically conductive element/s, wherein the upper magnetically conductive elements are arranged within a volume or area enclosed by subwinding structures, wherein a lower magnetically conductive element bridges the section of the winding structure between the volumes of two adjacent subwinding structures. In this case, a first end section of the lower magnetically conductive element can overlap an end section of a first upper magnetically conductive element, wherein another end section of the lower magnetically conductive element overlaps an end section of a second upper magnetically conductive element. The recess is provided between the upper magnetically conductive elements.

In a cross section, this arrangement of magnetically conductive elements in the row provides a hat-like structure.

Moreover, magnetically conducting elements or an arrangement of multiple magnetically conductive elements can be arranged in a row. In this case, multiple magnetically conductive elements can be arranged successively along the longitudinal axis of the primary winding structure. Further, at least two successive magnetically conductive elements are aligned with a lateral offset to one another. This can mean that a non-zero distance between the longitudinal axes of two successive magnetically conductive elements is provided along the lateral axis of the primary winding structure. The lateral offset can be provided along or against the lateral axis of the primary winding structure. Further, there can be no lateral offset between every second magnetically conductive element of the row.

The arrangement can have multiple rows, wherein a lateral offset between two successive magnetically conductive elements is only provided in selected but not in all rows. This means that the arrangement comprises one or more rows in which multiple magnetically conductive elements are arranged along the longitudinal axis of the primary winding structure with no lateral offset and one or more rows in which at least two successive magnetically conductive elements are arranged along the longitudinal axis with the said lateral offset.

It is, of course, possible that in addition to a lateral offset, a vertical offset is provided between two successive magnetically conductive elements of one row. By providing the lateral offset, it is possible to vary, e.g. increase, the gap between two adjacent rows along the lateral direction. This allows to arrange other components between the two adjacent rows, e.g. fixation means.

Further, the conductor arrangement can comprise at least one conductor (and in particular cable) bearing element. The conductor bearing element can denote an element adapted to position and/or to hold at least one subwinding or a part thereof, preferably all subwindings of the conductor arrangement. In particular, the conductor bearing element can be adapted to position and/or to hold a plurality of conductor segments or line sections of one or more electric conductors which can provide the phase line(s) of the primary-sided arrangement.

The conductor bearing element can comprises recesses forming spaces and/or projections delimiting spaces for receiving at least a section of at least one subwinding. The at least one subwinding can extend through these spaces.

Further, the conductor bearing element can be adapted to position and/or to hold at least one magnetically conductive element, preferably the magnetically conductive element(s) which is/are arranged within the volume enclosed by at least one of the subwindings. The conductor bearing element can be provided by a casting. Preferably, the conductor bearing element is provided by a magnetically non-conductive material, e.g. plastic.

The conductor bearing element can be formed as a shaped block which is described e.g. in GB 2485616 A or in GB 2505516 A. Therefore, the disclosure of GB 2485616 A and GB 2505516 A1, in particular the claimed embodiments, is/are incorporated into the present description by reference. Preferably, at least one end section of the conductor bearing element can have a tapered or frustum shape. The conductor bearing element can be arranged within a housing, in particular within an inner volume of the housing of an inductive power transfer pad. The conductor bearing element can be made of a magnetically non-conductive material, e.g. plastic or concrete or polymer.

The invention further relates to a system for an inductive power transfer, comprising at least two and preferably three conductor arrangements according to any of the above claims. The conductor arrangements may be energised or energisable with different and in particular individual operating currents. For example, a first conductor arrangement may be energised with a first operating current, a second conductor arrangement may be energised with a second operating current and a third conductor arrangement may be energised with a third conductor arrangement, each of said operating currents being different from one another e.g. due to a phase shift therebetween. This way, an alternating electromagnetic field can be generated. For example, a phase shift between the operating currents may be 120° (e.g. 120° between the first and the second operating current and 240° between the first and the third operating current, thus 120° between the second and third operating current).

In general, each conductor of a conductor arrangement of said system may thus be formed by or referred to as a phase line, wherein each phase line may be energised with an operating current according to one of the above examples, thereby allowing for generating an alternating electromagnetic field.

The invention further relates to a method for inductively supplying power to a vehicle, wherein an operating current is supplied to a conductor arrangement or to a system according to any of the above aspects. For example, the operating current may be supplied to a system comprising three conductor arrangements according to any of the above aspects, wherein one operating current is provided per conductor arrangement. For example, a first operating current may be supplied to a first conductor arrangement, a second operating current may be supplied to a second conductor arrangement and a third operating current may be supplied to a third conductor arrangement. In a standard operational mode, the first, second and third operating current may be controlled such that a predetermined phase shift between all three operating currents is provided. In a modified operational mode, the first, second and third operating current may be controlled such that a set of phase shift values comprises at most two non-zero values and all non-zero phase shift values are equal. Additionally or alternatively, one of the three operating currents may be reduced to zero and, optionally, the remaining operating currents may be controlled such that the non-zero phase shift value is a 180° phase angle.

The invention also relates to a method for manufacturing a conductor arrangement or a system according to any of the above aspects. Specifically, the method may comprise arranging a conductor so as to form at least a first and a second subwinding that are arranged next to one another, such that at least one conductor segment of each of the first and second subwinding run alongside one another in a first conductor bundle of the conductor arrangement, and connecting in said first conductor bundle the first subwinding and the second subwinding to one another via a first connecting conductor segment that crosses at least one further conductor segment of the conductor arrangement. In case of manufacturing a system, the above method may be applied for at least two and preferably three conductor arrangements and may further include arranging the plurality of conduct arrangements with respect to one another so as to form the system.

BRIEF DESCRIPTION OF THE DRAWINGS

In the following, an embodiment of the invention will be described with reference to the attached schematic figures. Features which correspond to one another with regard to their type and/or function may be assigned the same reference signs throughout the figures. In the figures.

DESCRIPTION OF THE INVENTION

Figure 1:
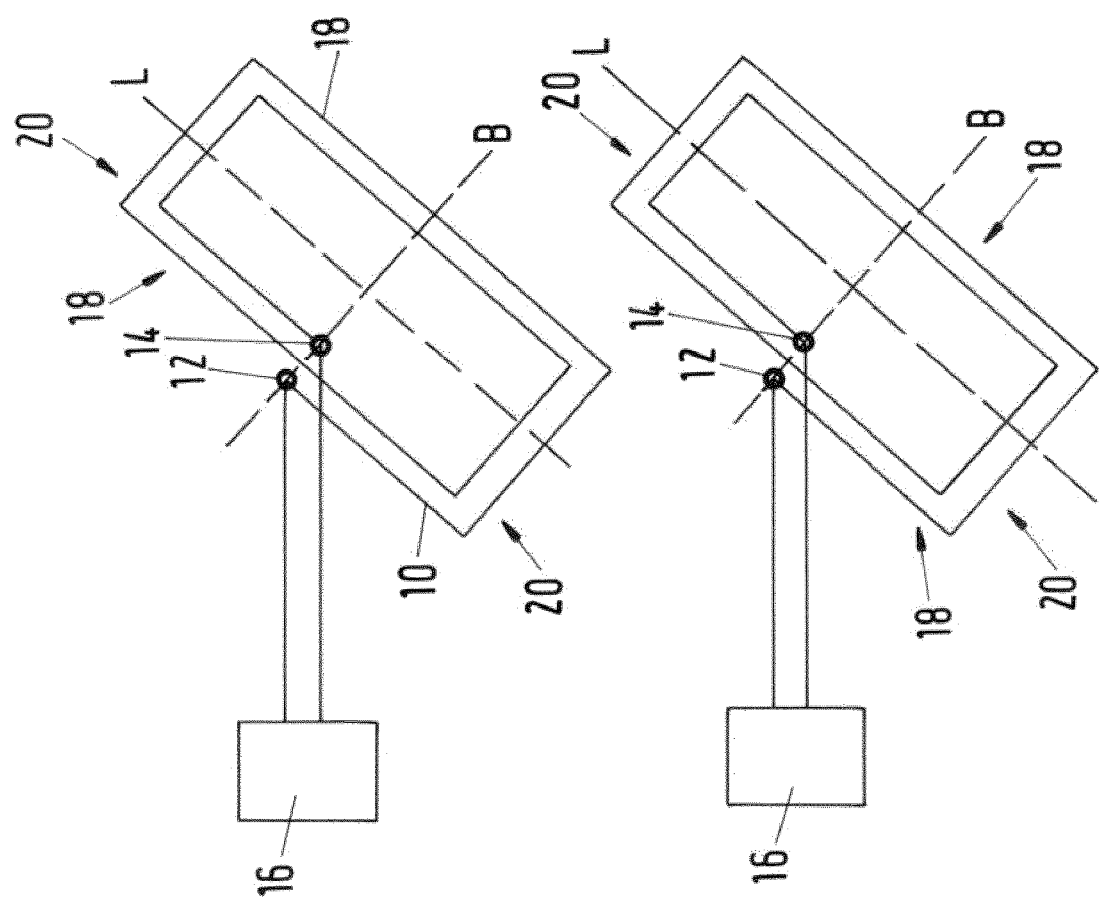
FIG. 1 schematically illustrates the basic problem of having to connect two subwindings to one another in order to form a conductor arrangement for the inductive power transfer.

FIG. 1 includes a schematic illustration of a basic problem underlying the present invention. Two windings 1, 2 are shown which are to be connected to form a conductor arrangement, the windings thus forming subwindings of said conductor arrangement. Each (sub) winding 1, 2 is formed by a continuous (i.e. non-interrupted or segmented) conductor 10, which may comprise or be provided by at least one electric line or cable (e.g. a phase line). In each case, the conductor 10 is laid with a plurality of bents in a spiral-type manner so as to form two turns and/or loops. More precisely, starting from a first connector 12, the conductor 10 is laid in a spiral-type manner so as to reach an inwardly positioned second connector 14. For illustrative purposes, each connector 12, 14 may be electrically connected to one pole of a voltage source 16 (e.g. an AC voltage source provided as a battery or grid connection), such that an electromagnetic field can be generated when the conductor 10 is energised with a current. The alternating current provided by a voltage source 16 is adapted to have a frequency close to a resonating frequency of a non-displayed secondary winding structure comprising a further conductor arrangement to allow for an efficient magnetic coupling of the participating conductor arrangements.

Moreover, each (sub) winding 1, 2 comprises a longitudinal axis L and a lateral axis B extending orthogonally thereto. The conductor segments of the conductor 10 extending along the longitudinal axis L generally form the longer segments 18 and/or longer dimension of a (sub) winding 1, 2. They may be referred to as pole legs and/or provide so-called active sections of a (sub) winding 1, 2. On the other hand, the (sub) windings 1, 2 each comprise shorter segments extending along the lateral axis B which may be referred to as winding heads 20 or further sections apart from the active sections 18. It is evident that the (sub) windings 1, 2 in the shown example are thus rectangularly shaped.

The (sub) windings 1, 2 are to be connected to one another in series in order to provide a conductor arrangement comprising a plurality of subwindings or, differently put, a plurality of poles each pole being provided by a respective subwinding. A respective conductor arrangement may then be used as a winding structure in a primary or secondary unit or in a primary or secondary winding structure, wherein in case of the secondary unit or secondary winding structure, the connection to a voltage source may be replaced by a connection to a DC rectifier.

Figure 2:
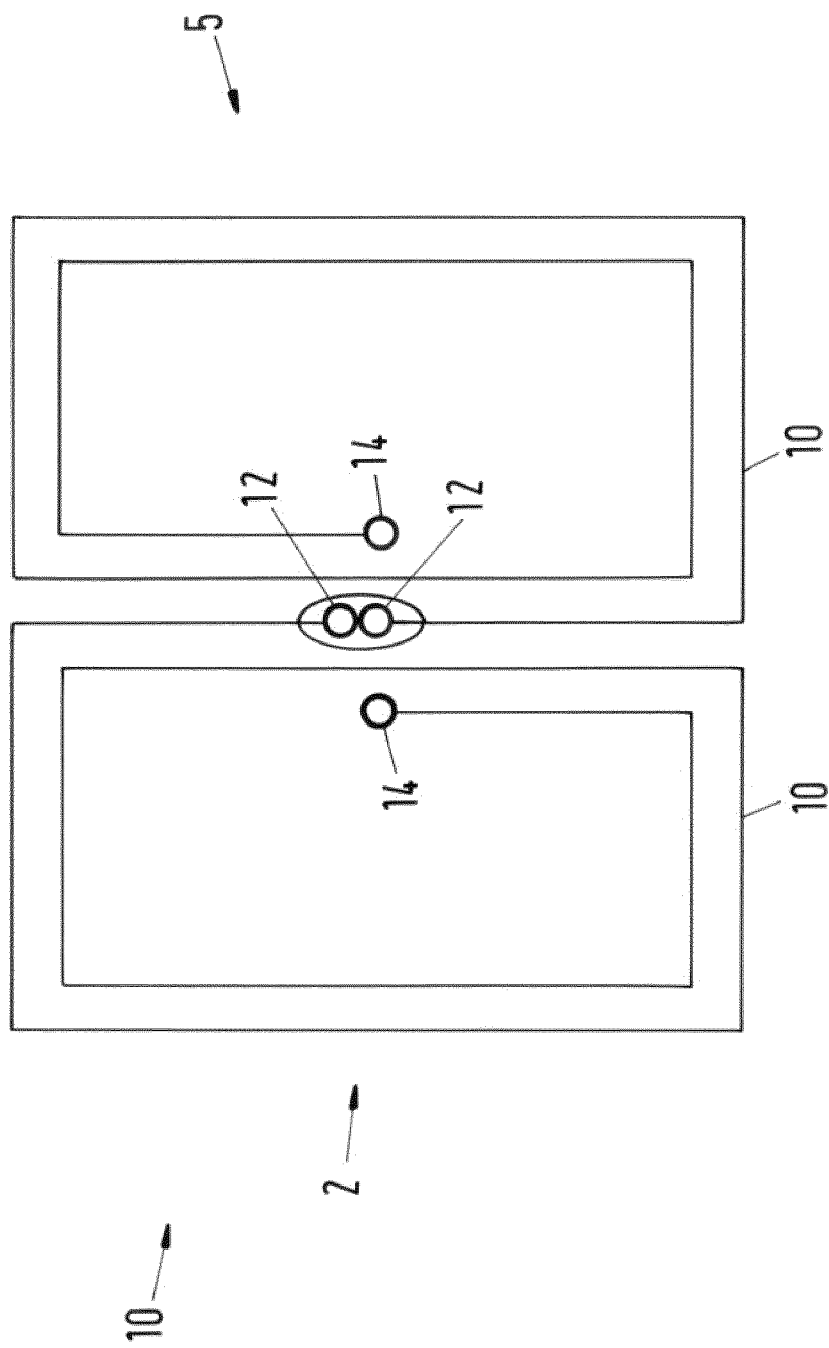
FIG. 2 illustrates a known solution to the problem of FIG. 1 according to the prior art.

A typical solution known from the prior art to provide such a connection is shown in FIG. 2. In this case, the windings 1, 2 have been connected by coupling their outer connectors 12 to one another via a non-specifically displayed capacitor. Thus, a conductor arrangement 5 is formed comprising the two subwindings 1, 2. The non-displayed capacitor is necessary to limit increasing potential differences along the conductor 10 when connecting the inner connectors 14 to different poles of a common voltage source. Apart from this need for further electrical components which increases the size and costs of the conductor arrangement 5, at least in the area of connecting the outer connectors 12 the generated electromagnetic field will be highly irregular. This can lead to an increase in the generated heat and in the magnetic losses and reduces the efficiency of the inductive power transfer. For the sake of completeness, it is to be noted that from one inner connector 14 to the other, the conductor(s) 10 extent without crossing any further conductor segments of any of the subwindings 1, 2.

Figure 3:
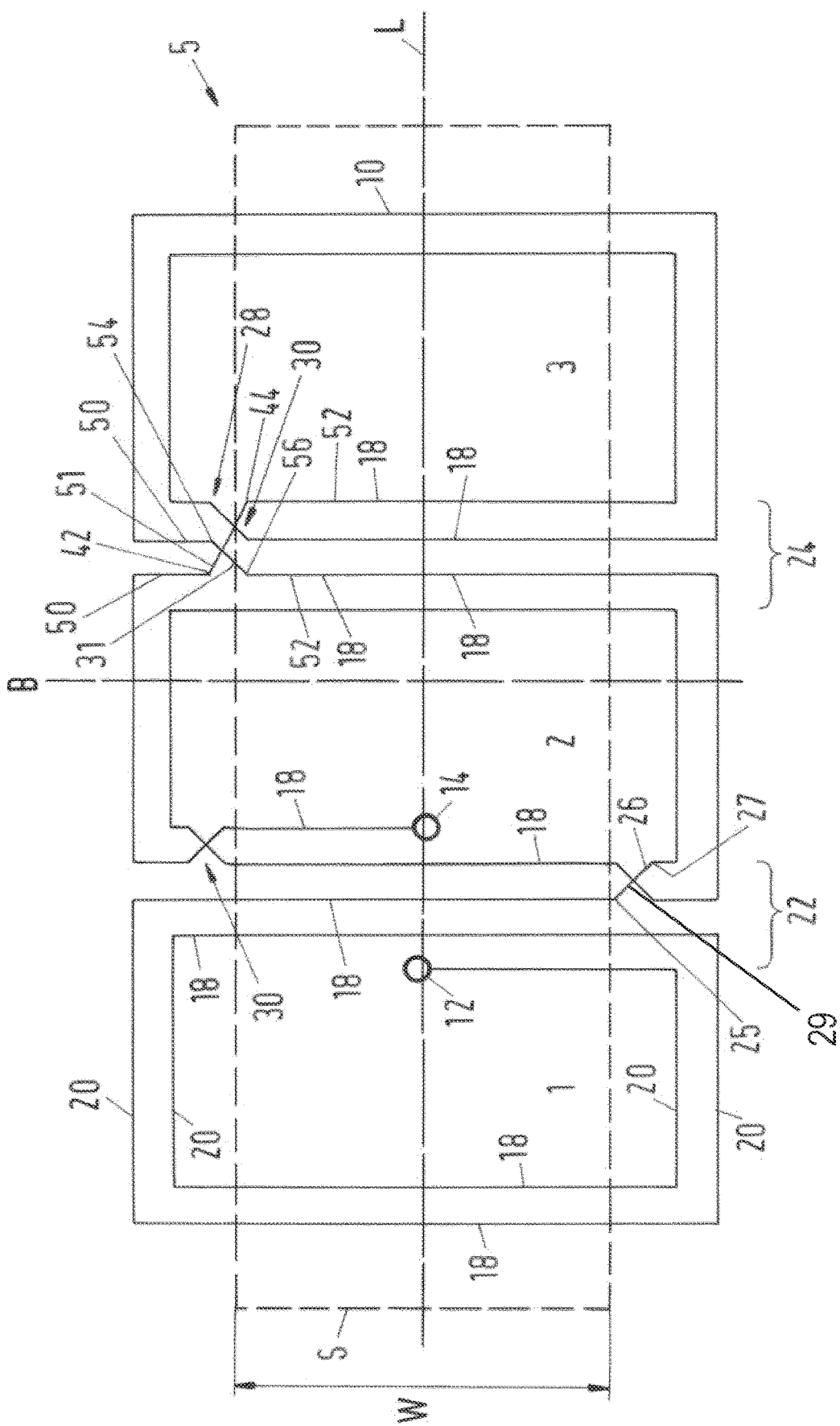
FIG. 3 illustrates a conductor arrangement according to a first embodiment of the invention.

FIG. 3 shows a conductor arrangement 5 according to a first embodiment of the invention. In the shown example, the conductor arrangement 5 comprises three subwindings 1, 2, 3 which may each provide and/or be referred to as a pole of the conductor arrangement 5. The number of subwindings 1, 2, 3, however, is only chosen by way of example and the conductor arrangement 5 could also be realised with, when viewed from the left, only the first two subwindings 1, 2. In general, the subwindings 1, 2, 3 are formed by a continuous (i.e. non-interrupted and non-segmented) conductor 10 extending from a first connector 12 to a second connector 14 and being laid (i.e. wound or bent) in such a manner, so as to form the respective subwindings 1, 2, 3. Each subwinding 1, 2, 3 comprises at least two turns or loops of the conductor 10. Also, as will be further discussed in the following, the subwindings 1, 2, 3 are connected to each other in series.

In FIG. 3, a longitudinal axis L and a lateral axis B of the conductor arrangement 5 are again shown. It can be seen that the subwindings 1, 2, 3 are arranged next to one another along said longitudinal axis L. When viewed from left to right, the leftmost subwinding 1 may be referred to as a first subwinding, the middle subwinding 2 may be referred to as a second subwinding and the rightmost subwinding 3 be referred to as a third subwinding 3.

For illustrative purposes, some of the reference signs which apply to all of the subwindings 1, 2, 3 may only be included for one of the subwindings 1, 2, 3 shown in FIG. 3.

Due to the plurality of windings or loops, each subwinding 1, 2, 3 comprises two pairs of (longer) conductor segments 18 extending along the lateral axis B, said pairs further extending in parallel to one another and at opposite sides of a respective subwinding 1, 2, 3. As noted above, these conductor segments 18 may e.g. be referred to as pole legs. Note that in the shown example, one pole leg 18 of each of the first and second subwinding 1, 2 and, more precisely, one interior pole leg 18 is marked by a shorter length than the remaining pole legs 18 of said subwinding 1, 2 due to being connected to a connector 12, 14. This, however, is not mandatory.

Further, each subwinding 1, 2, 3 comprises two pairs of (shorter) conductor segments 20 extending along the lateral axis B, said pairs further extending in parallel to one another and at opposite sides of a respective subwinding 1, 2, 3. As noted above, these conductor segments 20 may e.g. be referred to as winding heads.

From FIG. 3, it is further evident that a winding head 20 is connected to two opposite pole legs 18 and/or terminates at or extends between such opposite pole legs 18.

It is to be understood that in case the number of loops or turns a subwinding 1, 2, 3 is increased, the number of conductor segments 18, 20 running in parallel to one another may increase accordingly, so that two triplets or quadruplets instead of only pairs of respective conductor segments 18, 20 may be present.

Also, due to being connected to an inner connector 12 and then being laid in an outward-spiralling manner, a subwinding 1, 2, 3 generally comprises inner and outer conductor segments 18, 20. For example, the conductor segments 18, 20 adjacent to and/or facing the inner connector 12 can be referred to as inner conductor segments and the conductor segments 18, 20 facing the surroundings and/or the adjacent subwinding 1, 2, 3 may be referred to as outer conductor segments 18, 20.

Due to arranging the subwindings 1, 2, 3 next to one another, a region in which two adjacent subwindings 1, 2, 3 face each other (i.e., the region in which the first and second subwinding 1, 2 and the second and third subwinding 2, 3 face each other) comprises conductor segments and, more precisely, pole legs 18 of both adjacent subwindings 1, 2, 3 (i.e., at least one pole leg 18 of each adjacent subwinding 1, 2, 3). In this region, pole legs 18 belonging to respectively adjacent subwindings 1, 2, 3 run alongside as well as in parallel to one another. This local accumulation of adjacent pole legs 18 belonging to different subwindings 1, 2, 3 forms and is referred to as a conductor bundle 22, 24.

Specifically, the adjacent pole legs 18 of the first and second subwinding 1, 2 form a first conductor bundle 22 and the adjacent pole legs 18 of the second and third subwinding 2, 3 form a second conductor bundle 24. The conductor bundles 22, 24 each extend along the lateral axis B and thus at an angle to the winding heads 20.

In the following, the electric connections between the subwindings 1, 2, 3 by e.g. a connecting conductor segments 26 or connecting conductor crossing 28 will be discussed.

If following the course of the conductor 10 in first subwinding 1 and starting from the inner connector 12, the conductor 10 spirals outwardly towards an outer conductor segment in form of a pole leg 18 which faces the second subwinding 2 (i.e. is directly opposite thereto). This pole leg 18 terminates at a position marked 25 which (e.g. when viewed along the lateral axis B) is near a lower winding head 20 of the subwindings 1, 2, 3. With reference to the first conductor bundle 22, the length of the pole leg 18 which terminates at position 25 makes up for 80% of the total length of the conductor bundle 22. For example, the position 25 may be at a distance along the lateral axis B of less than 10 cm and e.g. 5 cm from the outer lower winding heads 20 of the subwindings 1, 2, 3.

Further, a first connecting conductor segment 26 is shown which starts from and connects to said outer pole leg 18 at the position 25. This connecting conductor segment 26 is marked by a comparatively small length of not more than 10 cm. It extends at an angle to both of the longitudinal and lateral axis A, B and towards the second subwinding 2. Specifically, the first connecting conductor segment 26 extends towards and terminates at a position marked 27, said position belonging to an inner conductor segment of the second subwinding 2. The position 27 may be located close or belong to an interior lower winding head 20 of said second subwinding 2 or, generally put, may be positioned close or belong to, when viewed along the lateral axis B, an interior winding head 20 of the second subwinding which is closest to the connecting conductor segment 26 (e.g. the lower interior winding head 20 is closer to said first connecting conductor segment 26 than the upper interior winding head 20 of FIG. 3).

The first connecting conductor segment 26 thus extends between the above discussed positions 25 and 27 and it starts from/terminates at an outer pole leg 18 of the first subwinding 1 and directly at or at least at the position 27 close to an interior winding head 20 of the second subwinding 2.

Moreover, it can be seen that the first connecting segment 26 crosses a further conductor segment of the conductor arrangement 5 marked 29 and specifically a conductor segment 29 belonging to an outer pole leg 18 of the second subwinding 2, said pole leg 18 facing the first subwinding 1. In the shown example, the crossed conductor segment 29 extends at an angle to both of the longitudinal and lateral axis A, B. This, however, is not mandatory. Yet, in the depicted example, the connecting conductor segment 26 and the crossed conductor segment 29 enclose an angle (and in fact four angles) of 90° with one another.

The described conductor crossing enables the conductor 10 within the second subwinding 2, starting from position 27, to be laid in an outwardly spiraling manner. This is done in such a way that, when viewed starting from the position 27, after forming a lower inner winding head segment 20, an inner a pole leg segment 18 on a side opposite the connecting conductor segment 26 and an upper inner winding head segment 20, and outer pole leg 18 is formed facing the first subwinding 1. In particular, said outer pole leg 18 lies oppositely 2 the outer pole leg 18 of the first subwinding 1 which faces the second subwinding 2. Accordingly, between said pole legs 18, the conductor 10 extends with a limited length defined only by the three above-mentioned conductor segments or, differently put, three quarters the length of an inner loop of the second subwinding 2. Due to said limited length, the outer pole leg 18 of the second subwinding 2 facing the first subwinding 1 has only a limited potential difference compared to the oppositely arranged outer pole leg 18 of the first subwinding 1.

This is advantageous e.g. for safety reasons as a risk of short circuits is reduced (e.g. a short circuit resulting from an insulation between the adjacent pole legs 18 being pierced through as a result of high potential differences).

Laying the conductor 10 within the second subwinding 2 in the above described manner is simplified by providing an as such optional internal conductor crossing 30 in the second subwinding 2. Said internal conductor crossing 30 is positioned at an end of the first conductor bundle 22 that is opposite to the end comprising the first connecting conductor segment 26.

Accordingly, said internal conductor crossing 30 is positioned close to or directly connected to the upper winding heads 20 of the second subwinding 2. Similar to the first connecting conductor segment 26, the conductor crossing 30 is positioned at a distance along the lateral axis B of less than 10 cm and e.g. 5 cm from the outer upper winding heads 20 of the subwindings 1, 2, 3 and/or at a distance to said winding heads 20 which is not more than 20% or not more than 10% of the total length of the first conductor bundle 22 along the lateral axis B.

In said internal conductor crossing 30, an outer conductor segment 32 which forms an outer segment of a first pole leg 18 of the second subwinding 2 within the first conductor bundle 22 is laid so as to become an inner pole leg 18 that is connected to a second connector 14 of the conductor arrangement 5. Moreover, a second pole leg 18 which starts from the upper inner winding head 20 of the second subwinding as an inner pole leg 18, is laid so as to become the above discussed outer pole leg 18 of the second subwinding 2 within the conductor bundle 22. This may be referred to as changing an order of the pole legs 18 by way of the internal conductor crossing 30.

Apart from the above discussed reduction of the potential differences between the pole legs 18 of the adjacent subwindings 1, 2, this enables to position the second connector 14 in a more flexible in generally preferred manner. Specifically, this enables to position said connector 14 at an edge portion of the first connector bundle 22 when viewed along the longitudinal axis A. In turn, this means that within the first conductor bundle 22, three pole legs of the adjacent subwindings 1, 2 (i.e. two of the first subwinding 1 and one of the second subwinding 2) can be positioned directly next to one another without any connectors 12, 14 therebetween. This is beneficial with regard to the regularity of the generated electromagnetic field.

Moreover, this means that the first and second connector 12, 14 can be position at a similar height .g. when viewed along the lateral axis B. As will be discussed in the following with reference to FIG. 4, this allows for positioning the connectors 12, 14 in or above gaps and in particular a common gap between magnetically conductive elements, such that an amplification of electromagnetic disturbances associated with said connectors 12, 14 is limited.

As shown above, due to the first connecting conductor segment 26 crossing a further segment 29 of the conductor arrangement 5, advantages with regard to reducing potential differences within said conductor arrangement 5 can be achieved. If further adding the as such optional internal conductor crossing 30, further advantages regarding the position of the conductors 12, 14 are achievable (or at least more easily achievable than without said internal conductor crossing 30, i.e. said crossing 30 not been mandatory for this advantage achieving). This is also the case if providing the depicted conductor arrangement 5 with only to subwindings and in particular only the first and second but not the third subwinding 1, 2, 3.

However, it may be preferred to add a respective third subwinding 3, e.g. for generating a three-phase alternating electromagnetic field which may be provided by the system 100 depicted in FIG. 5 discussed below. Said third subwinding 3 is positioned next to the second subwinding 2 along the longitudinal axis L and connected thereto in series. For doing so, a connecting conductor crossing 28 is provided which extends within a second conductor bundle 24. The second conductor bundle 24 comprises a pair of pole legs 18 of each subwinding 2, 3 (i.e. four pole legs 18 in total), said pole legs 18 running alongside and in parallel to one another and along the longitudinal axis A.

The connecting conductor crossing 28 is positioned at an upper end of the second conductor bundle 24 in FIG. 3. It is positioned with a distance to the upper winding heads 20 of the subwindings 1, 2, 3 that is similar to the distance of the internal conductor crossing 30 discussed above (e.g. a distance of not more than 10 cm or not more than 5 cm or not more than 20% or 10% of the length of the second conductor bundle 24 along the lateral axis B).

The connecting conductor crossing 28 connects and extends between an inner pole leg 18 of the third subwinding 3 and an upper segment of an outer pole leg 18 of the second subwinding 2. For doing so, a second connecting conductor segment 51 is provided which starts from/terminates at the positions marked 42 and 44 of the respective pole legs 18. Also, the second connecting conductor segment 51 extends at an angle with respect to both of the lateral axis Band longitudinal axis A. It can further be seen that the second connecting conductor segment 51 crosses two further conductor segments of the conductor arrangement 5.

Specifically, it crosses a third connecting conductor segment 31 also belonging to the connecting conductor crossing 28. Said connecting conductor segment 31 connects a lower section 52 of an outer pole leg 18 of the second subwinding 2 and an upper section 50 of the outer pole leg 18 of the third subwinding 3. Both outer pole legs 18 of the second and third subwinding 2, 3 are thus split in a respective upper and lower section 50, 52 by means of the connecting conductor crossing 28 and not provided as a continuous member or strand. Overall, the second connecting conductor segment 31 thus extends between the positions marked 54, 56 in FIG. 3 as well as at an angle to both of the longitudinal and lateral axes L, B.

Further, the second connecting conductor segment 51 also crosses a pole leg segment 18 and specifically a segment in which an (when viewing from to top to bottom on FIG. 3) initially interior pole leg 18 of the third subwinding 3 is laid so as to be continued as an outer pole leg 18 of said subwinding 3. This may be regarded as an internal conductor crossing 30 of the third subwinding 3 (at least when considering the crossed part of segment 51 to belong to the third subwinding 3) which is, in the depicted example, included in the connecting conductor crossing 28.

The reason that the connecting conductor crossing 28 comprises two connecting conductor segments 51, 31 is that the third subwinding 3 does not comprise any connectors 12, 14. The conductor 10 thus has to be guided into the third subwinding 3 and out thereof or, differently put, when starting from the second subwinding 2 the conductor 10 has to be connected to and outer spiral-starting (or -end) point 54 as well as to an interior spiral-starting (or -end) point 44 of the third subwinding 3.

However, due to the connecting conductor crossing 28 between the second and third subwinding 2, 3, the longer lower sections 52 of the outer pole legs 18 of the second and third subwinding 2, 3 facing each other, have a comparatively low potential difference. This is evident when following the conductor path starting from the point 54 and along the outer winding of the third subwinding 3 until the internal conductor crossing 30 is reached. Again, this provides advantages in terms of safety.

Finally, in FIG. 3 in area S is marked extending along the longitudinal axis L with a defined width W. Said width W is defined by a length of the pole legs 18 of the subwindings 1, 2, 3 between the first connecting conductor segment 26 and the internal crossing 30 as well as the connecting conductor crossing 28 along the lateral axis B. In the area S between said connections and crossings 26, 30, 28, the conductor arrangement 5 is marked by a high level of symmetry and produces a comparatively regular electromagnetic field. The sections of the pole legs 18 extending within said area as and with a length equivalent to the width W may be referred to as active sections, e.g. since they substantially determine the characteristics of the generated electromagnetic field especially when interacting (e.g. resonating) with a non-depicted further conductor arrangement 5 of a further winding unit. Due to the above described positions of the above listed connections and crossings 26, 30, 28, the width W and thus length of the active sections is comparatively large and e.g. amounts to at least 60% or at least 80% of the total length of the first or second conductor bundles 22, 24 along the lateral axis B. This further increases the efficiency of the inductive power transfer.

In the following, FIG. 4 will be discussed. In said figure, a conductor arrangement 5 is shown comprising three subwindings 1, 2, 3 which are arranged next to one another along a longitudinal axis L as well as at a same height along a lateral axis B. Apart from the differences discussed in the following, the conductor arrangement 5 is generally configured and functions similarly to that of the previous embodiment. For illustrative purposes, features that are e.g. similar for each of the subwindings 1, 2, 3 may not in each case be marked by a respective reference sign.

Compared to the embodiment of FIG. 3, the connectors 12, 14 are located within the second and third subwinding 2, 3 and the first subwinding 1 is free of a respective connector 12, 14. Each subwinding 1, 2, 3 again comprises two pairs of winding heads 20 and pole legs 18, which are arranged and dimensioned similar to the respective winding heads 20 and pole legs 18 of the first embodiment.

The first and second subwinding 1, 2 are connected to one another via a connecting conductor crossing 28. This connecting conductor crossing 28 is similarly configured to the connecting conductor crossing 28 discussed in the previous embodiment with respect to the connection between the second and third subwinding 2, 3. Accordingly, it is evident that the first and second subwinding 1, 2 of the present embodiment are connected to one another via at least one first connecting conductor segment 26 and in fact two respective (first) connecting conductor segments 26.

As previously discussed, these cross each other but one of said connecting conductor segments 26 also crosses a pole leg segment 18 of the first subwinding 1. This may be regarded as forming an internal conductor crossing 30 (e.g. when considering the crossing part of segment 26 to belong to the first subwinding 1). For the sake of completeness, it is to be noted that the connecting conductor segment(s) 26 of the shown example is positioned within a first conductor bundle 22 which this is similarly configured to the second conductor bundle of the first embodiment.

The connecting conductor segment 26 which crosses two further conductor segments connects to a conductor segment 70 of the second subwinding 2 comprising a lower outer winding head 20 of said second subwinding 2. Said conductor segment 70 terminates at and connects to a first connector 12.

The connecting conductor segment 26 which only crosses one further conductor segment (i.e. the further connecting conductor segment 26) terminates at and connects to an outer pole leg 18 of the second subwinding 2, said pole leg 18 being positioned in the first conductor bundle 22.

In general, the same advantages with respect to limited potential differences result from the depicted connection between the first and second subwinding 1, 2 as explained in connection with the connecting conductor crossing 28 of the first embodiment.

The second and third subwinding 2, 3, on the other hand, are not connected to one another via a conductor segment crossing any further segment. Instead, an angled conductor segment 60 is shown, which connects an outer pole leg 18 of the second subwinding 2 with a lower section of the outer pole leg 18 of the third subwinding 3. On the other hand, the second subwinding 2 comprises an internal conductor crossing 30. This allows for forming a further inner loop of said subwinding 2.

Moreover, it is evident that the directly adjacent outer pole legs 18 of the second and third subwindings 2, 3 have a limited potential difference since the outer pole leg 18 of the second subwinding 2 is separated from the outer pole leg 18 of the third subwinding 3 by only three conductor segments (two winding heads 20 and one pole leg 18). In addition, it is evident that the second connector 14 which is placed in the third subwinding 3 forms an inner end or start point of the spiral or loop structure of said subwinding 3.

Again, it is evident that the connectors 12, 14 are positioned at the same height along the lateral axis B and within the region or directly within a second conductor bundle 24 comprising the adjacent pairs of pole legs 18 of the second and third subwinding 2, 3 (four pole legs 18 in total).

The conductor arrangement 5 further comprises an arrangement of magnetically conducting elements 72. These are formed as ferrite bars extending in parallel to and being oriented along the longitudinal axis L while being separated from one another by gaps 53. The gaps 53 form local areas of a limited and in particular of a locally decreased magnetic conductivity. The magnetically conducting elements 72 also extend in one common plane which is parallel to a plane in which the conductor arrangement 5 extends. In one example, the conductor arrangement 5 is (preferably directly) placed on the arrangement of magnetically conducting elements 72.

Figure 4:
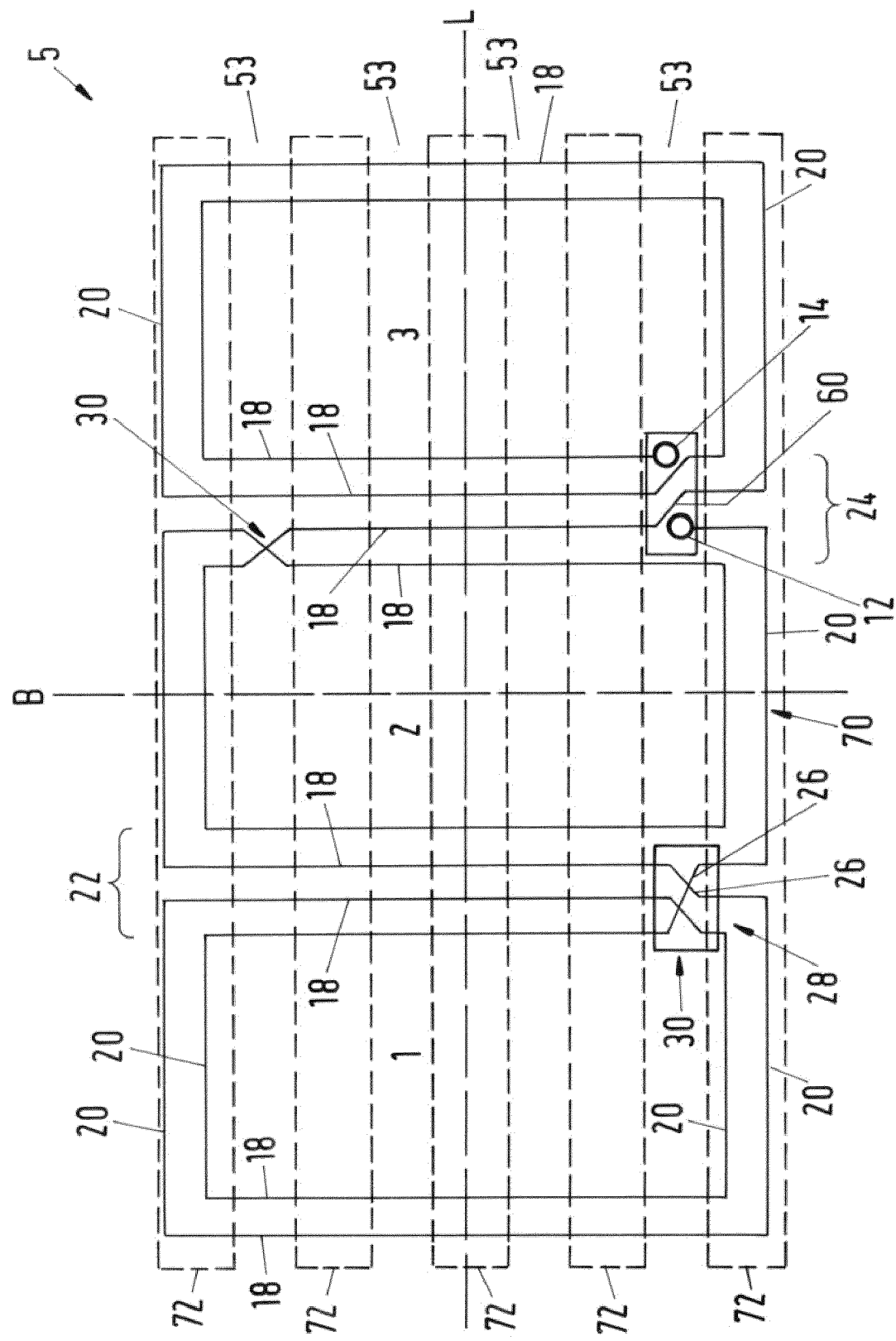
FIG. 4 illustrates a conductor arrangement according to a second embodiment of the invention.

From FIG. 4, it is evident that each conductor crossing 28, 30 as well as the connectors 12, 14 are placed above one of the gaps 53 of the arrangement of magnetically conducting elements 72. This helps to limit an amplification of the electromagnetic disturbances associated with these crossings 28, 30 and connectors 12, 14. Apart from this, the function and working principle of the magnetically conducting elements 72 corresponds to that of known solutions and as has been previously discussed in the general part of this disclosure.

Figure 5:
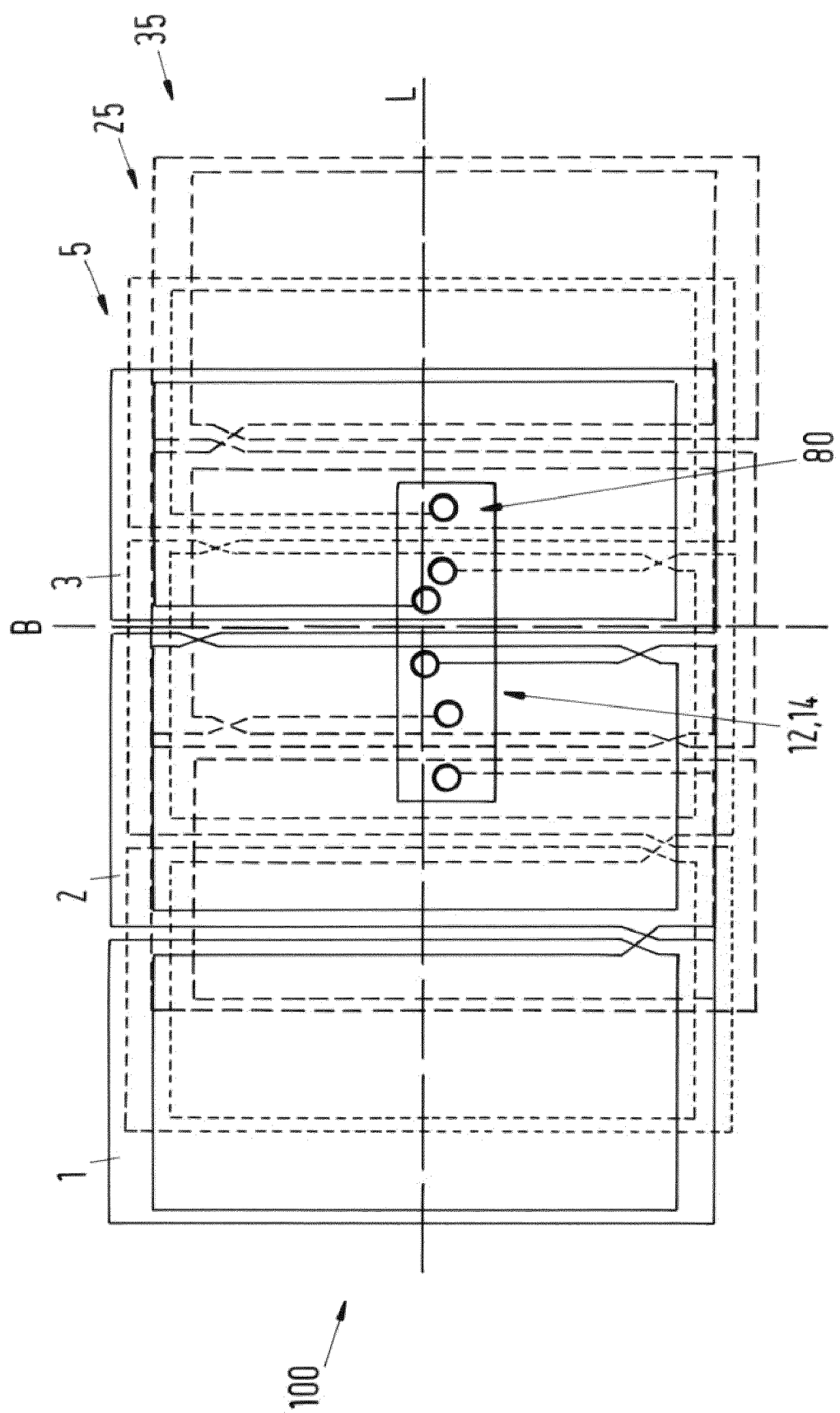
FIG. 5 illustrates a system according to a first embodiment of the invention which comprises a plurality of conductor arrangements.

In FIG. 5, a system 100 according to an embodiment of the invention is shown. Said system comprises three conductor arrangements 5, 25, 35. Each arrangement 5, 25, 35 comprises three subwindings 1, 2, 3 arranged next to one another along a longitudinal axis L. For illustrative purposes, some reference signs may in FIG. 5 only be included for one of the subwindings 1, 2, 3 and/or conductor arrangements 5, 25, 35 even though they related to each of these structures.

Each of the conductor arrangements 5, 25, 35 may be energised with a distinct operating current. In particular, the operating currents may have a relative phase shift to one another of e.g. 120°.

This way, an alternating electromagnetic field can be generated. This working principle is generally known and e.g. described in WO 2016/207291 A1.

Note that in FIG. 5 a partially perspective view of the system 100 is shown. Contrary from what appears to be depicted, the conductor arrangements 5, 25, 35 are shifted relative to one another along the longitudinal axis L but our positioned at the same height along the lateral axis B (i.e. the winding heads 20 being aligned with and/or congruent to one another).

The subwindings 1, 2, 3 of each conductor arrangement 5, 25, 35 may generally be configured according to one of the previous embodiments. In particular, the conductor arrangements 5, 25, 35 comprise crossing conductor segments according to one of the previous examples. Due to the additional degrees of freedom for placing the connectors 12, 14 in each conductor arrangement 5, 25, 35, said degrees of freedom being provided by the possibility to cross wires, the connectors 12, 14 can be placed in proximity to one another. Specifically, an area 80 is shown comprising all of the connectors 12, 14 of the system 100. It can be seen that said area 80 is marked by a limited height along the lateral axis B (of e.g. less than 20 cm or less than 10 cm). Also, a length of the area 80 along the longitudinal axis is less than four times the height of this area 80.

Accordingly, the connectors 12, 14 may be placed substantially at the same height level or at a distance along the lateral axis B of less than 20 cm, less than 10 cm or less than 5 cm. Along the longitudinal axis L, the connectors 12, 14 may be positioned along a length (e.g. a length of the area 80) of not more than 50 cm, not more than 30 cm or not more than 20 cm. This local concentration of connectors 12, 14 helps to improve the regularity of the generated electromagnetic.

In FIG. 5, an arrangement of magnetically conducting elements 72 (one arrangement for the whole system 100) is not specifically displayed but may be configured similarly to FIG. 4. Due to positioning the connectors 12, 14 at a substantially same height level or at a limited lateral distance, all of the connectors 12, 14 may again be positioned above gaps 53 and in particular the same gap 53 of the arrangement of magnetically conducting elements 72.

The invention claimed is:

1. A conductor arrangement for an inductive power transfer, the conductor arrangement comprising:
   a conductor arranged so as to form at least a first subwinding and a second subwinding that are arranged next to one another, such that at least one conductor segment of each of the first subwinding and the second subwinding run alongside one another in a conductor bundle of the conductor arrangement, wherein the conductor bundle comprises pole legs of the first subwinding and the second subwinding that run alongside and parallel to one another;
   wherein the first subwinding, and the second subwinding each comprises at least one inner conductor segment and one outer conductor segment,
   wherein the first subwinding and the second subwinding are connected to one another via a connecting conductor crossing, wherein the connecting conductor crossing comprises two conductor crossings adjacent each other, wherein a first conductor crossing comprises a first connecting conductor segment that crosses over a second connecting conductor segment at an angle with regard to the second connecting conductor segment and wherein a second conductor crossing comprises the first connecting conductor segment crossing over a third connecting conductor segment at an angle with regard to the third connecting conductor segment,
   wherein the first connecting conductor segment connects an inner conductor segment of the second subwinding to one of the conductor segments of the first subwinding,
   wherein the second connecting conductor segment connects an outer conductor segment of the second subwinding to at least one further conductor segment of the first subwinding, and
   the outer conductor segment of the second subwinding is directly connected to the outer conductor segment of the first subwinding.

2. The conductor arrangement according to claim 1, wherein the first subwinding has a connector to a voltage source and the conductor is laid starting from said connector in an outwardly spiraling manner towards the first connecting conductor segment.

3. The conductor arrangement according to claim 1, wherein the third connecting conductor segment is part of the first subwinding or the second subwinding.

4. The conductor arrangement according to claim 1, wherein the first connecting conductor segment terminates at or close to a conductor segment of the one of the first subwinding and the second subwinding that runs at an angle to the conductor bundle.

5. The conductor arrangement according to claim 1, wherein each of the first subwinding and the second subwinding forms a pole of the conductor arrangement and comprises at least first and second pole leg and at least a first and second winding head and wherein the conductor bundle comprises at least one pole leg of each of the first subwinding and the second subwinding.

6. The conductor arrangement according to claim 1, wherein the at least one further conductor segment that is crossed by the first conductor connecting conductor segment forms part of or terminates at or close to a pole leg of one of the first subwinding or the second subwinding.

7. The conductor arrangement according to claim 1, wherein the first subwinding and the second subwinding are arranged next to one another along a longitudinal axis and the conductor bundle extends at an angle to said longitudinal axis.

8. The conductor arrangement according to claim 1, wherein a position at which the conductor segments cross each other is located at or near an edge portion of the conductor bundle.

9. The conductor arrangement according to claim 1, wherein the conductor extends within the conductor arrangement as a continuous member or element and/or as a continuous sequence of conductor segments.

10. The conductor arrangement according to claim 1, wherein the one of the first subwinding and the second subwinding of the conductor arrangement comprises a first connector for electrically connecting to a first pole of a voltage source and the other one of the first subwinding and the second subwinding of the conductor arrangement comprises a second connector for electrically connecting to a second pole of the voltage source, and wherein the conductor arrangement is configured to conduct a current between the first and second connector.

11. The conductor arrangement according to claim 10, wherein the first and second connectors are positioned at a substantially similar height and/or are positioned such that a distance between the connectors along a lateral axis of the conductor arrangement that extends orthogonally to a longitudinal axis is less than 0.3 meters.

12. The conductor arrangement according to claim 10, further comprising an arrangement of one or more magnetically conducting elements, wherein the first and second connector are positioned in or above an area having a locally limited magnetic conductivity.

13. The conductor arrangement according to claim 1, further comprising an arrangement of one or more magnetically conducting elements, wherein a position of at least one conductor crossing of the conductor arrangement is located in or above an area having a locally limited magnetic conductivity.

14. A system for an inductive power transfer, comprising at least two conductor arrangements according to claim 1.

15. A method for inductively supplying power to a vehicle, wherein an operating current is supplied to the conductor arrangement according to claim 1.

16. The conductor arrangement according to claim 1, further comprising an arrangement of at least two magnetically conducting elements, wherein the first conductor crossing or the second conductor crossing is located in or above a gap between the at least two magnetically conducting elements.

* * * * *

UNITED STATES PATENT AND TRADEMARK OFFICE
CERTIFICATE OF CORRECTION

PATENT NO. : 11,798,736 B2
APPLICATION NO. : 17/270535
DATED : October 24, 2023
INVENTOR(S) : Rudolf Lindt It is certified that error appears in the above-identified patent and that said Letters Patent is hereby corrected as shown below:

In the Claims

Column 26, Line 37, Claim 6, after "first" delete "conductor"

Signed and Sealed this
Twenty-sixth Day of December, 2023

Katherine Kelly Vidal
*Director of the United States Patent and Trademark Office*